United States Patent
Hantschel et al.

(10) Patent No.: US 9,612,258 B2
(45) Date of Patent: Apr. 4, 2017

(54) PROBE CONFIGURATION AND METHOD OF FABRICATION THEREOF

(71) Applicants: IMEC, Leuven (BE); Katholieke Universiteit Leuven, Leuven (BE)

(72) Inventors: Thomas Hantschel, Houtvenne (BE); Menelaos Tsigkourakos, Leuven (BE); Wilfried Vandervorst, Mechelen (BE)

(73) Assignees: IMEC, Leuven (BE); Katholieke Universiteit Leuven, Leuven (BE)

( * ) Notice: Subject to any disclaimer, the term of this patent is extended or adjusted under 35 U.S.C. 154(b) by 217 days.

(21) Appl. No.: 14/527,526

(22) Filed: Oct. 29, 2014

(65) Prior Publication Data

US 2015/0185249 A1  Jul. 2, 2015

(30) Foreign Application Priority Data

Oct. 29, 2013 (EP) ..................................... 13190655
Jan. 27, 2014 (EP) ..................................... 14152595

(51) Int. Cl.
    *G01Q 70/16* (2010.01)
    *G01Q 70/14* (2010.01)
    *B82Y 35/00* (2011.01)

(52) U.S. Cl.
    CPC ............. *G01Q 70/14* (2013.01); *G01Q 70/16* (2013.01); *B82Y 35/00* (2013.01)

(58) Field of Classification Search
    CPC ..................................................... G01Q 70/16
    See application file for complete search history.

(56) References Cited

U.S. PATENT DOCUMENTS

| | | | |
|---|---|---|---|
| 6,504,151 B1* | 1/2003 | Mitchell | B82Y 35/00 73/105 |
| 2002/0047091 A1* | 4/2002 | Hantschel | B82Y 35/00 250/234 |

(Continued)

FOREIGN PATENT DOCUMENTS

| | | |
|---|---|---|
| DE | 10 2004 012 044 A1 | 9/2005 |
| EP | 2 133 883 A2 | 12/2009 |

(Continued)

OTHER PUBLICATIONS

Extended European Search Report dated Apr. 28, 2014 in European Patent Application No. 14152595.6.

(Continued)

*Primary Examiner* — Wyatt Stoffa
*Assistant Examiner* — James Choi
(74) *Attorney, Agent, or Firm* — Knobbe, Martens, Olson & Bear LLP

(57) ABSTRACT

The disclosed technology relates generally to probe configurations, and more particularly to probe configurations and methods of making probe configurations that have a diamond body and a diamond layer covering at least an apex region of the diamond body. In one aspect, a method of fabricating a probe configuration includes forming a probe tip. Forming the probe tip includes providing a substrate and forming a recessed mold into the substrate on a first side of the substrate, wherein the recessed mold is shaped to form a probe body having an apex region. Forming the probe tip additionally includes forming a first diamond layer on the substrate on the first side, wherein forming the first diamond layer includes at least partially filling the recessed mold with the first diamond layer such that a probe body having an apex region is formed in the recessed mold. Forming the probe tip additionally includes patterning to remove at least partially the first diamond layer which surrounds the probe (Continued)

body, removing a substrate material surrounding at least the apex region of the probe body, and forming a second diamond layer covering at least the apex region of the probe body. The method additionally includes attaching the probe tip to a first end of a cantilever and attaching the second end of the cantilever to a holder.

8 Claims, 15 Drawing Sheets

(56) References Cited

U.S. PATENT DOCUMENTS

| | | | | |
|---|---|---|---|---|
| 2006/0157440 | A1* | 7/2006 | Jung | B82Y 35/00 216/2 |
| 2007/0070685 | A1* | 3/2007 | Rust | B82Y 10/00 365/151 |
| 2011/0055987 | A1* | 3/2011 | Moldovan | B29C 33/3857 850/40 |
| 2012/0291161 | A1* | 11/2012 | Zhang | G01Q 60/56 850/56 |

FOREIGN PATENT DOCUMENTS

| | | |
|---|---|---|
| EP | 2 535 725 A1 | 12/2012 |
| JP | 2010-145124 A | 7/2010 |
| WO | WO 2009/012180 A1 | 1/2009 |

OTHER PUBLICATIONS

Park et al., "Fabrication of Diamond Tip Cantilever and its Application to Tribo-nanolithography," *Computational Intelligence in Robotics and Automation*, 2005. CIRA 2005. Proceedings. 2005 IEEE International Symposium on ESPOO, Finland Jun. 27-30, 2005, pp. 695-700.

Smirnov et al., "Diamond-Modified AFM Probes: From Diamond Nanowires to Atomic Force Microscopy-Integrated Boron-Doped Diamond Electrodes," *Analytical Chemistry*, vol. 83, 2011, pp. 4936-4941.

* cited by examiner

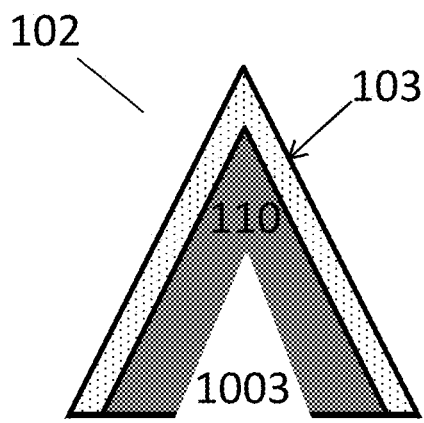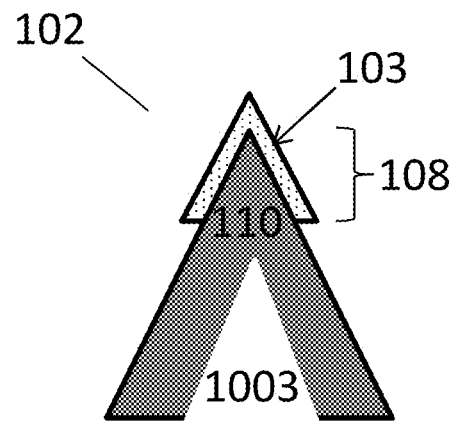
FIG. 6A     FIG. 7A
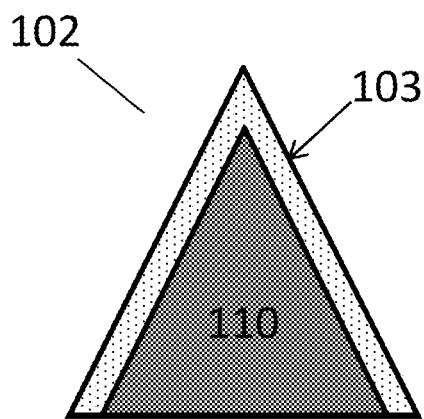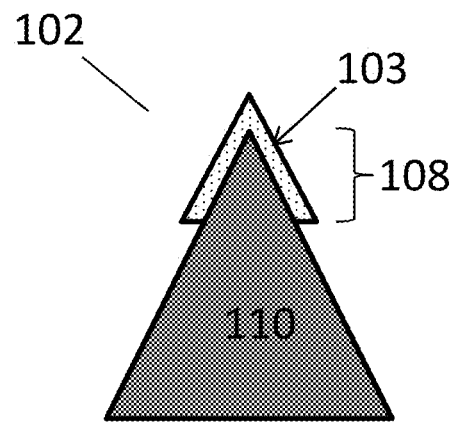
FIG. 6B     FIG. 7B

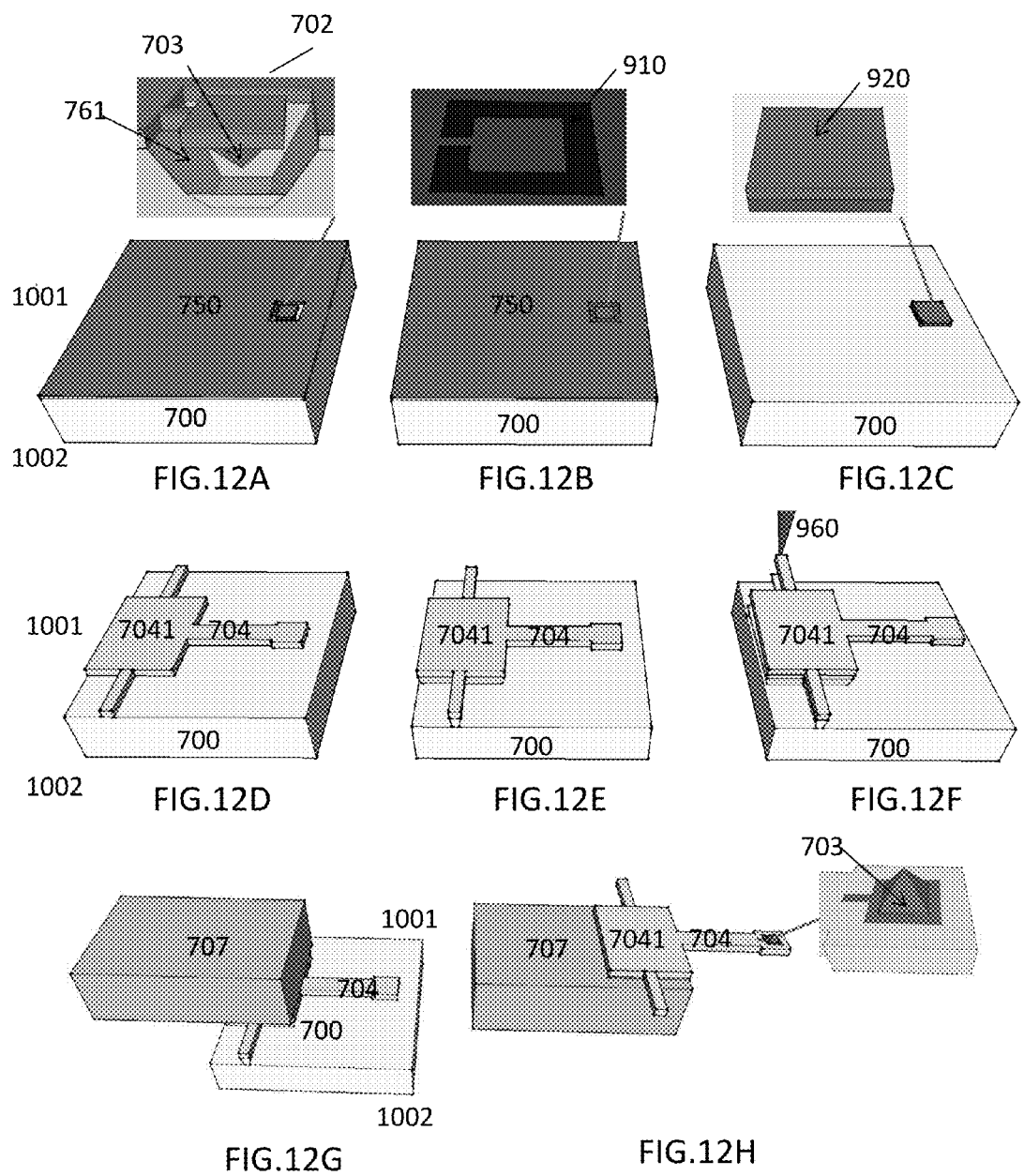

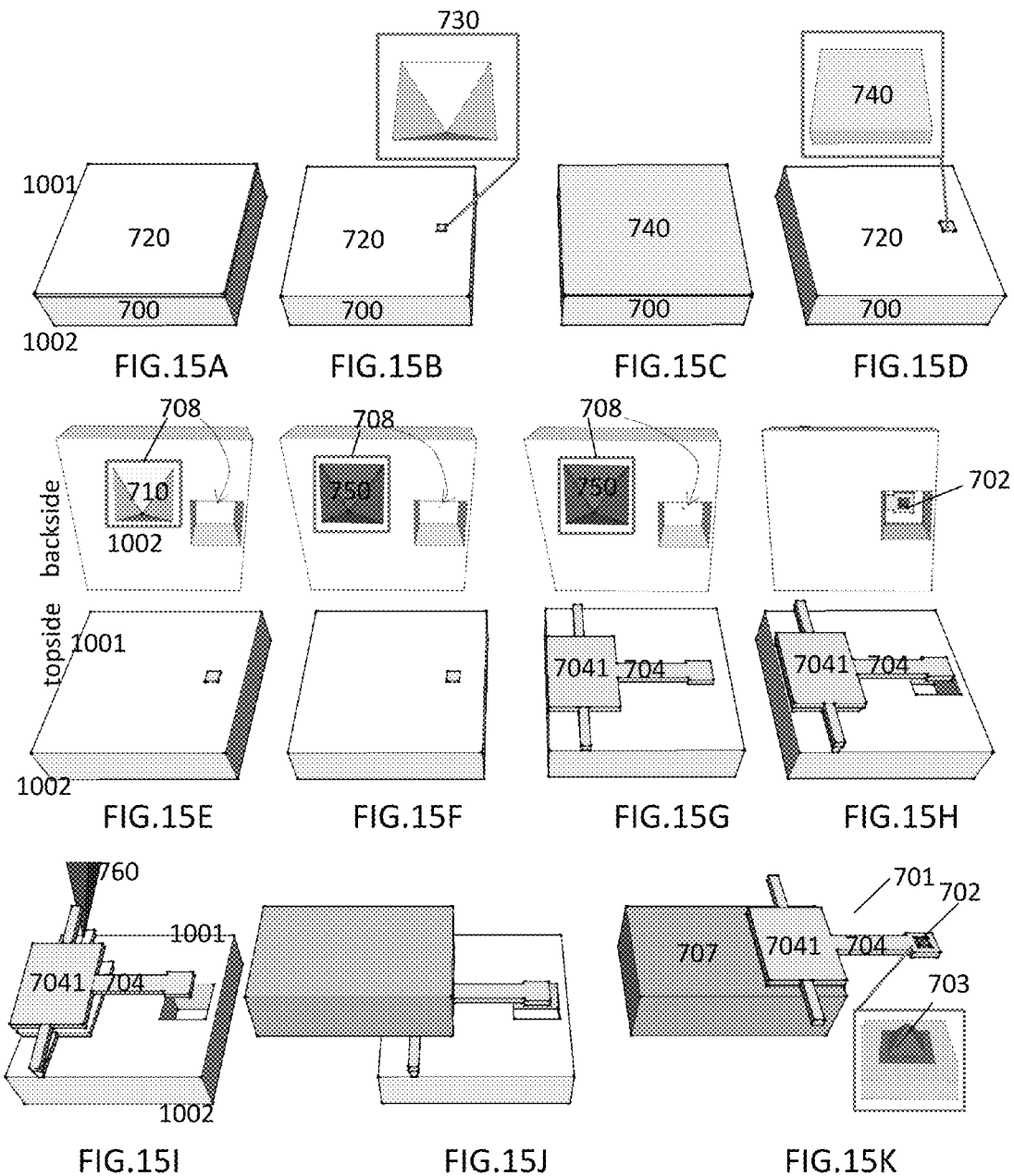

20x20 µm²

30x30 µm²

40x40 µm²

PROBE CONFIGURATION AND METHOD OF FABRICATION THEREOF

CROSS-REFERENCE TO RELATED APPLICATIONS

This application claims foreign priority to European patent applications EP 13190655.4, filed Oct. 29, 2013, and EP 14152595.6, filed Jan. 27, 2014, the contents of which are incorporated by reference herein in their entireties.

BACKGROUND OF THE INVENTION

Field of the Invention

The disclosed technology relates to probe assemblies adapted for probe-based characterization techniques, such as surface analysis techniques including scanning probe microscopy techniques such as atomic force microscopy (AFM) and related techniques, or nanoprobing techniques. More particularly, the disclosed technology relates to probe configurations that are formed at least partly of diamond-based materials, and methods of manufacturing such probe configurations.

Description of the Related Technology

Scanning proximity microscopy or scanning probe microscopy (SPM) systems, such as an atomic force microscopy (AFM) system, a scanning tunneling microscopy (STM) system, a magnetic force microscopy (MFM) system, a spreading resistance microscopy (SSRM) system, operate by scanning the surface of a sample with a probe having a small tip. The probe configuration typically comprises a mounting or holding block to which a cantilever, also known as stylus, is mounted. Attached to this cantilever is a tip which is pointing towards the sample surface when scanning this surface. This tip preferably has a high hardness and low wear. The tip and the holding block are mounted at opposite ends along the length of the cantilever. During the scanning of the surface, the sample is moving relative to the tip either by movement of the sample only, by movement of the tip or by a combined movement of both tip and sample.

Such a probe can be used for measuring the topography of the sample's surface by sliding the probe over the surface and monitoring the position of the tip at each point along the scan line. In this application the conductive properties of the tip are less relevant and dielectric or semiconductor materials can be used to manufacture the tip. The probe can also be used for determining the electrical properties of a sample, for example the resistance and electrical carrier profile of a semiconductor sample. For these applications at least the tip of the probe must be conductive.

Another application which makes use of a probe configuration is nanoprobing. A nanoprobing system typically comprises a scanning electron microscopy (SEM) system for viewing the surface of the sample to be probed or scanned, nanomanipulators (also often referred to as nanoprober) comprising the probe configuration for contacting the surface and parameter analyzer(s) for performing electrical measurements of the sample via the nanomanipulators. So far, only manually etched tungsten probes are available as probe tips for the nanoprobing system. The tip sharpness is limited to about 20-100 nm. Such tungsten probes are easily damaged while repeatedly contacting the sample surface and they show rapid wear and have a low lifetime. They are not hard enough for probing semiconductor materials such as Si and Ge.

For SPM applications there is a strong need for highly conductive, sharp and strong tips which may overcome the disadvantages of prior art tips.

For nanoprobing applications, there is a strong need for microfabricated tips instead of manually fabricated tips. Moreover alternative materials besides tungsten should be usable as tungsten tips suffer from oxidation and are not hard enough for probing on Si and Ge. The tips should also be sharper to improve the attainable resolution in the nanoprobing measurements.

There is thus a need for a probe configuration which allows for characterizing a sample with (ultra) high resolution with high yield, which can be manufactured cost-efficiently and where the tip has a high hardness, high conductivity and thus a high dynamic range detectability.

SUMMARY OF CERTAIN INVENTIVE ASPECTS

It is an aim of the disclosed technology to present a probe configuration comprising a tip being highly conductive (as such being able to characterize a high dynamic range of doping concentrations), being sharp (as such being able to characterize samples with a high resolution) and being strong and wear-resistant (as such preventing breaking or wearing off during scanning and enhancing the life time of a probe).

It is an aim of the disclosed technology to present a method for fabricating such a probe configuration.

The disclosed technology is related to a probe configuration and a method for producing a probe configuration, as disclosed in the appended claims.

According to a first aspect, a probe configuration for characterizing a sample is disclosed, the probe configuration comprising a holder; a cantilever having a base end attached to said holder and a distal end extending away from the holder; a tip being arranged near the distal end of the cantilever, the tip having a shape with a base plane, a side surface extending from the base plane up to an apex; wherein the tip comprises a diamond body and a diamond layer covering at least an apex region, the apex region being a part of the side surface of the solid diamond body that starts from and includes the apex.

According to embodiments of the first aspect, the diamond body is a molded diamond body.

According to embodiments of the first aspect, the diamond body is a solid diamond body or a partially solid diamond body. A partially solid diamond body is a hollow solid diamond body.

According to embodiments of the first aspect, the diamond layer is completely covering the solid diamond body.

According to embodiments of the first aspect, the diamond layer is also covering part of the cantilever. The probe configuration according to this embodiment can be produced according to known methods for producing prior art probe configurations having a diamond-coated silicon tip on a cantilever and wherein the diamond layer covers part of the cantilever.

According to embodiments of the first aspect, the diamond body and/or the diamond layer comprise any of microcrystalline diamond, nanocrystalline diamond, ultra-nanocrystalline diamond or diamond-like-carbon (DLC).

According to embodiments of the first aspect, the tip is pyramidal shaped or knife-shaped or tapered shape or in-plane shaped.

According to embodiments of the first aspect, the diamond layer and/or the diamond body is conductive.

According to embodiments of the first aspect, the conductive diamond layer and/or the diamond body is boron-doped.

According to embodiments of the first aspect, diamond nanocrystals protrude from the diamond layer.

According to embodiments of the first aspect, the diamond layer has a thickness between 5 and 500 nm.

According to a second aspect, a method for fabricating a probe configuration according to the first aspect is disclosed, the method comprising providing a substrate, the substrate having a top side and a back side being opposite to the top side; forming a tip of the probe configuration by first forming from a first diamond layer a diamond body having an apex region and thereafter providing a second diamond layer at least on the apex region of the diamond body, forming a diamond body comprising etching a mold in the substrate; depositing the first diamond layer on the substrate thereby filling the mold with the first diamond layer and forming the diamond body having an apex in the mold; patterning the first diamond layer around the mold; underetching the first diamond layer at the apex region thereby releasing the diamond body from the substrate. According to an embodiment of the method according to the disclosed technology, an array of tips is formed in the substrate.

According to embodiments of the second aspect, wherein forming the diamond body and providing the second diamond layer is done from the top side of the substrate.

According to embodiments of the second aspect, wherein forming the diamond body is done from the top side of the substrate and wherein providing the second diamond layer is done from the back side of the substrate.

According to embodiments of a second aspect, the method further comprises attaching a cantilever structure to the tip after providing the second diamond layer. The tip is attached at one side of the cantilever structure.

According to embodiments of a second aspect, attaching the cantilever structure comprises manufacturing the cantilever structure separately and attaching the cantilever structure to the tip by gluing or soldering.

According to embodiments of a second aspect, the method further comprises attaching the cantilever with the tip attached thereto to a holder. The cantilever with the tip attached thereto at one side of the cantilever structure is attached to the holder with the other opposite side of the cantilever structure. The tip is attached to the cantilever structure at its distal end whereas the holder is attached to the cantilever at its base end.

According to an third aspect, a method for fabricating a probe configuration comprising a cantilever and connected to the cantilever, a tip with a diamond body is disclosed, the method comprising providing a substrate having a top side and a back side being opposite to the top side; etching a mold in the substrate from the top side of the substrate; depositing a first diamond layer on and from the top side of the substrate thereby filling the mold with the first diamond layer thereby forming a diamond body having an apex region; patterning the first diamond layer from the top side of the substrate; underetching the first diamond layer at the apex region from the back side of the substrate thereby releasing the diamond body; providing from the back side of the substrate a second diamond layer at least on the apex region of the solid diamond body.

According to embodiments of a third aspect, the method further comprises attaching a cantilever structure to the tip after providing the second diamond layer. The tip is attached at one side of the cantilever structure.

According to embodiments of a third aspect, attaching the cantilever structure comprises manufacturing the cantilever structure separately and attaching the cantilever structure to the tip by gluing or soldering.

According to embodiments of a third aspect, the method further comprises attaching the cantilever with the tip attached thereto to a holder. The cantilever with the tip attached thereto at one side of the cantilever structure is attached to the holder with the other opposite side of the cantilever structure. The tip is attached to the cantilever structure at its distal end whereas the holder is attached to the cantilever at its base end.

According to embodiments of the third aspect, an array of multiple tips is provided each of the tips comprising a diamond body and a diamond layer at least partially covering the diamond body at the apex region.

According to a fourth aspect, a method of fabricating a probe configuration includes forming a probe tip. Forming the probe tip includes providing a substrate and forming a recessed mold into the substrate on a first side of the substrate, wherein the recessed mold is shaped to form a probe body having an apex region. Forming the probe tip additionally includes forming a first diamond layer on the substrate on the first side, wherein forming the first diamond layer includes at least partially filling the recessed mold with the first diamond layer such that a probe body having an apex region is formed in the recessed mold. Forming the probe tip additionally includes patterning to remove at least partially the first diamond layer which surrounds the probe body, removing a substrate material surrounding at least the apex region of the probe body, and forming a second diamond layer covering at least the apex region of the probe body. The method additionally includes attaching the probe tip to a first end of a cantilever and attaching the second end of the cantilever to a holder.

It is an advantage of embodiments of the disclosed technology that the disclosed probe configuration has both a high hardness and a high conductivity. Thereby the probe configuration of the disclosed technology has the advantage that a high dynamic range of dopant concentrations in the sample can be detected when using the probe configuration for electrical characterization. A range in between $5\times14/cm^3$ and $1\times21/cm^3$ may be detected.

It is an advantage of embodiments of the disclosed technology that the disclosed probe configuration of the present invention has a high mechanical stability such that the tip cannot break/wear off. Thereby the life-time of the probe for measuring at very high resolution (in the nanometer range) is enhanced and thus performance is maximized and costs are reduced.

It is an advantage of embodiments of the disclosed technology that the disclosed probe configuration allows for nanoprobing of hard semiconductor materials (which is not possible with prior art tungsten nanoprobe needles). It is not manually fabricated like tungsten wire tips but is made by microfabrication techniques which allow for cost-efficient mass production.

It is an advantage of embodiments of the disclosed technology that the disclosed probe configuration allows for improved resolution measurements since the probe configuration provides a sharp tip with extending diamond crystals making the contact with the sample to be characterized. A resolution in the sub-nanometer (≤1 nm) may be achieved.

BRIEF DESCRIPTION OF THE DRAWINGS

FIGS. 6A-6B schematically illustrate a tip of a probe configuration according to embodiments.

FIGS. 7A-7B schematically illustrate a tip of a probe configuration according to embodiments.

FIGS. 12A-12H are isomeric views of schematic intermediate structures illustrating various stages of fabrication of a probe configuration having a tip attached to the cantilever of the probe, according to embodiments.

FIGS. 15A-15K are isomeric views of schematic intermediate structures illustrating various stages of fabrication of a tip of a probe configuration according to embodiments.

DETAILED DESCRIPTION OF CERTAIN ILLUSTRATIVE EMBODIMENTS

Figure 1:
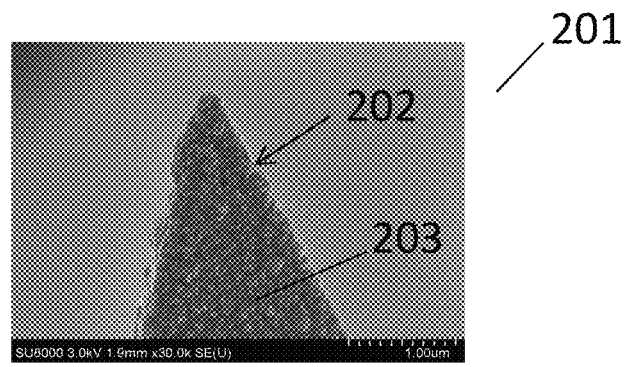
FIG. 1 is a secondary electron microscopy (SEM) image of an apex region of a coated diamond tip (CDT).

The disclosed technology will be described with respect to particular embodiments and with reference to certain drawings but the disclosed technology is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosed technology.

Furthermore, the terms first, second, third and the like in the description and in the claims, are used for distinguishing between similar elements and not necessarily for describing a sequential or chronological order. The terms are interchangeable under appropriate circumstances and the embodiments of the disclosed technology can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosed technology described herein can operate in other orientations than described or illustrated herein.

Furthermore, the various embodiments, although referred to as "preferred" are to be construed as exemplary manners in which the disclosed technology may be implemented rather than as limiting the scope of the disclosed technology.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the disclosed technology, the only enumerated components of the device are A and B, and further the claim should be interpreted as including equivalents of those components.

As used herein, a probe configuration, also referred to as a probe, refers to a configuration which includes a mounting block, also referred to as a holding block, to which a cantilever, also referred to as a stylus, is mounted. Attached to the cantilever can be a tip, which points towards the sample surface when a surface of the sample is scanned. The tip and the holding block are typically mounted at opposite ends along the length of the cantilever. When the surface of the sample is scanned, the sample moves relative to the tip, as a result of a movement of the sample only, a movement of the tip only, or by a combined movement of both the tip and the sample.

Figure 9:
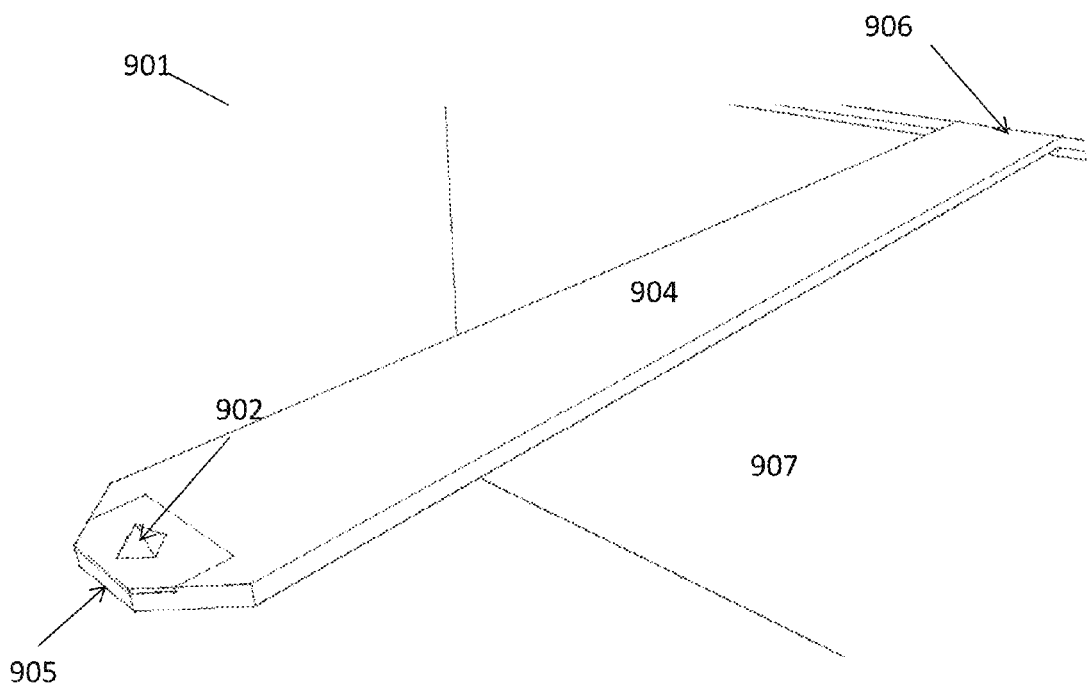
FIG. 9 is a schematic representation of a probe configuration according to embodiments.

FIG. 9 shows an example of a probe (configuration) 901 configured for atomic force microscopy, comprising a cantilever 904 having a tip 902 at a distal end 905 and it's a base end 906 attached to a holder 907. The illustrated tip 902 of FIG. 9 has a pyramidal shape.

In some probe-based techniques, carrier profiling of semiconducting devices can be carried out at nanometer and sub-nanometer scales using a sharp, relatively strong and highly conductive diamond tips. One such probe-based technique is scanning spreading resistance microscopy (SSRM). SSRM is related to atomic force microscopy (AFM), but employs a conductive tip to scan across a sample surface to measure, e.g., map, the local spreading resistance underneath the tip. An ultra-high pressure in the GPa range is often used in SSRM measurements on Si and Ge structures to obtain a good electrical contact by establishing a so-called beta-tin phase underneath the tip, without being bound to any theory. Few materials can withstand these high pressures, and therefore SSRM measurements are often performed using conductive diamond tips that can withstand such pressures.

Nowadays two types of probes comprising diamond tips are widely used: coated diamond probes (CDP) with diamond-coated silicon tip (CDT) and full diamond probes (FDP) with full diamond tip (FDT).

Some coated diamond probe configurations (CDP) have a Si cantilever and a diamond-coated silicon tip attached to the Si cantilever, where the Si tip has a thin diamond layer coated over it. For electrical measurements a conductive diamond coating is used. Diamond-coated silicon tips are, for example, disclosed in an article from Niedermann et al., "Chemical vapor deposition diamond for tips in nanoprobe experiments," *J. Vac. Sci. Technol.* A 14, 1233 (1996).

Figure 2:
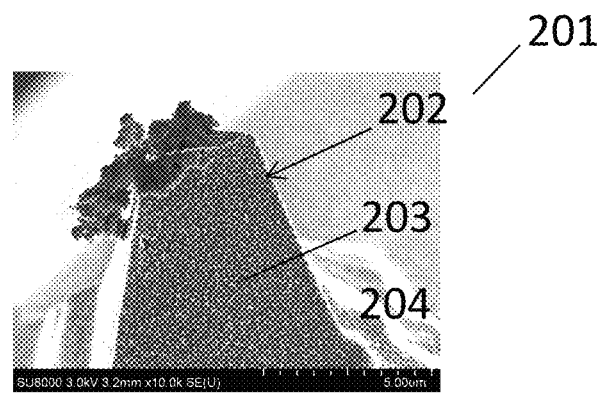
FIG. 2 is an SEM image of the apex region of a CDT after scanning a sample.

FIGS. 1 and 2 are secondary electron microscopy (SEM) images of some coated diamond probe configuration (CDP) 201.

FIGS. 1 and 2 illustrate coated diamond probe configuration (CDP) 201 comprising a Si tip 202 which is coated by a thin (~100-200 nm) diamond layer 203 which is for electrical applications (such as for example SSRM doped with boron). The diamond-coated Si tip is mounted at an end of a cantilever 204.

FIG. 2 illustrates an example failure of one CDT. When used in SSRM, due to the high lateral scanning forces resulting from high vertical tip pressures, which are in the order of GPa, onto the substrate surface, the CDT exhibits breaking-off/shearing-off, more frequently close to the apex region. In fact, many SSRM measurements carried out with a CDT are carried out with a broken tip at the apex region, resulting in a blunt tip, e.g., having a diamond crystal sticking out from the sidewall of the broken tip. The resulting tip configuration can be undesirable, as a blunt tip can reduce the resolution in SSRM and can also cause measurement artefacts, such as for example multiple tip images.

A full diamond probe configuration (FDP) comprises a metal, Si or diamond cantilever having a solid diamond pyramidal tip (FDT) attached thereto. Full diamond probes and their manufacturing method are for example disclosed in an article of Hantschel et al. "Highly conductive diamond probes for scanning spreading resistance microscopy," *Appl. Phys. Lett.* 76(12), 1603 (2000).

Figure 3:
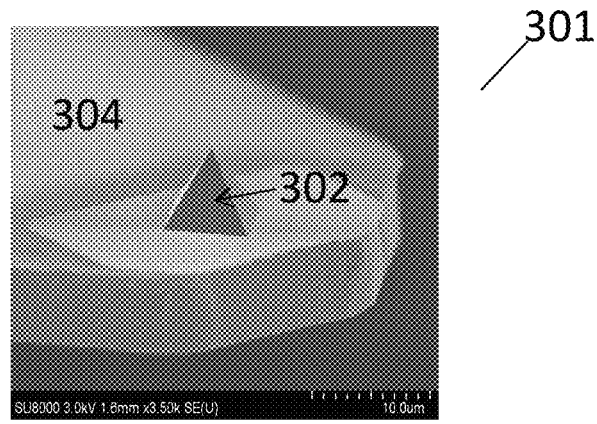
FIG. 3 is an SEM image of a full diamond probe tip (FDT).

FIG. 3 illustrates a SEM image of an example of a full diamond probe configuration (FDP) 301. The FDP 301 comprises a full diamond tip (FDT) 302, which is a solid diamond pyramid obtained by a molding process, whereby an inverted pyramid is first anisotropically etched into Si. This mold is then filled up with diamond and the Si mold is subsequently etched away. The pyramidal diamond tip 302 is doped with boron for electrical applications such as for example SSRM. The tip 302 is fixed to an end of a cantilever 304. The cantilever can be a metal cantilever, such as for example a Ni cantilever but can also be Si or diamond.

Most advanced FDTs have a spatial resolution of 1 nm which is higher than the spatial resolution of CDTs being limited due to their coating, and are fabricated on wafer scale using standard 200-mm Si wafer technology. Despite the ultra-high resolution of FDT, CDT can have a higher electrical conductivity. This is because CDT use the last grown (outer and higher quality) diamond layer whereas FDT use the first grown diamond layer. Recent research from Simon et al., "Initial growth stages of heavily boron doped HFCVD diamond for electrical probe application," in *Physica Status Solidi* (a) 210, 2002 (2013) has shown that this first grown diamond layer suffers from poorer quality, such as a lower level of electrically active boron and $SiC/SiO_xC_x$-related interfacial layers in the initial growth phase.

Figure 4:
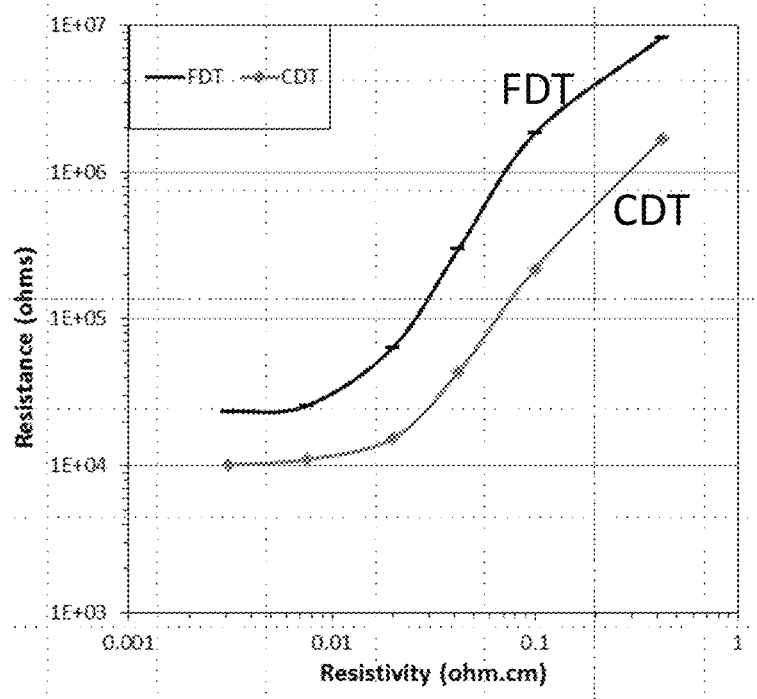
FIGS. 4 and 5 are spreading resistance microscopy (SSRM) calibration curves taken on staircase structures for both CDT and FDT.
Figure 5:
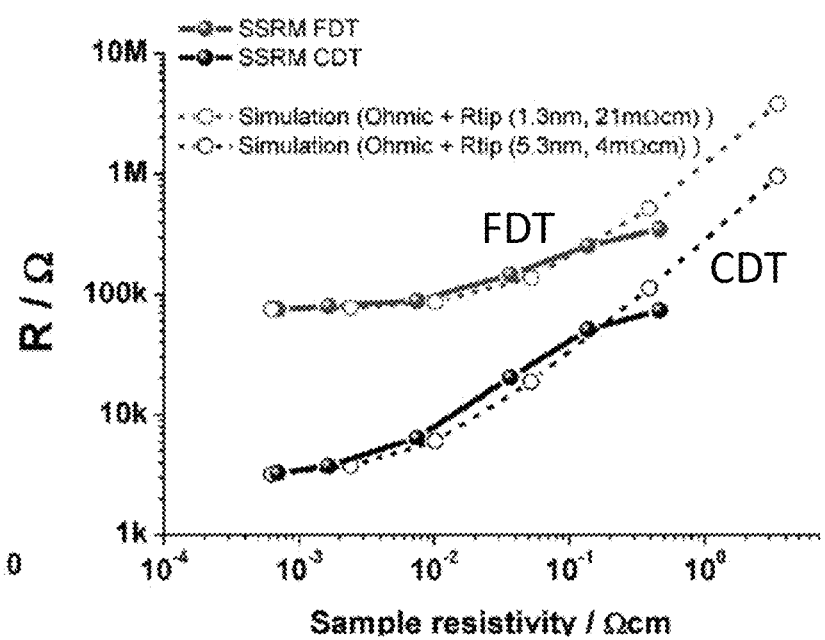

FIG. 4 shows typical (SSRM) calibration curves taken on Si doping staircase structures using FDT (top curve) and CDT (bottom curve). FIG. 5 shows typical (SSRM) calibration curves taken on Ge doping staircase structures using FDT (top curve) and CDT (bottom curve). In FIG. 4, the y-axis represents the measured resistance, which is plotted as a function of the measured sample resistivity in the x-axis, whose values can be linked to the doping concentration of the sample calibration curve. The FDT curves are positioned above the CDT curves which indicates their higher sharpness and thus higher resolution. The more shallow slope of the FDT compared to CDT in the highly conductive region (left side of the curves) indicates its lower electrical conductivity. In FIG. 5, the experimental calibration curves similar to the calibration curves of FIG. 4 are compared against simulations (open dots), and are illustrated to be in good agreement with the experimental results (full dots). This is also presented by A. Schulze et al. in "A comprehensive model for the electrical nanocontact on germanium for scanning spreading resistance microscopy applications." *J. Appl. Phys.* 113, 114310 (2013).

Based on the foregoing, there is a need for a tip configuration which combines the advantages of the CDP (relatively high electrical conductivity) and the FCP (relatively high hardness and sharpness) for scanning probe microscopy (SPM) applications.

In addition to SPM applications, there is also a need for sharp and hard tips in nanoprobing applications. Nanoprobing commonly refers to a technique whereby a micromanipulator, often also referred to as nanomanipulator, is used to manipulate, measure and pick-and-place small structures on micrometer and nanometer scale. Nanoprobing uses commonly electro-chemically etched tungsten wire needle tips which are prone to oxidation and are not hard enough for measuring on semiconductors like Si and Ge.

Thus, in the following, a probe configuration which combines the advantages of the CDP (relatively high electrical conductivity) and the FCP (relatively high hardness and sharpness) are disclosed, as well as a method for manufacturing the same.

FIGS. 6A-6B and 7A-7B schematically illustrate a tip 102 of a probe configuration according to embodiments of the disclosed technology. The tip 102 of the probe configuration comprises a diamond body 110 and a diamond film or thin diamond layer 103 covering at least the apex region 108 of the tip 102 as shown schematically in FIGS. 7A-7B. According to embodiments, the diamond film 103 may also completely cover the diamond body 102 as is schematically shown in FIGS. 6A-6B.

Figure 8:
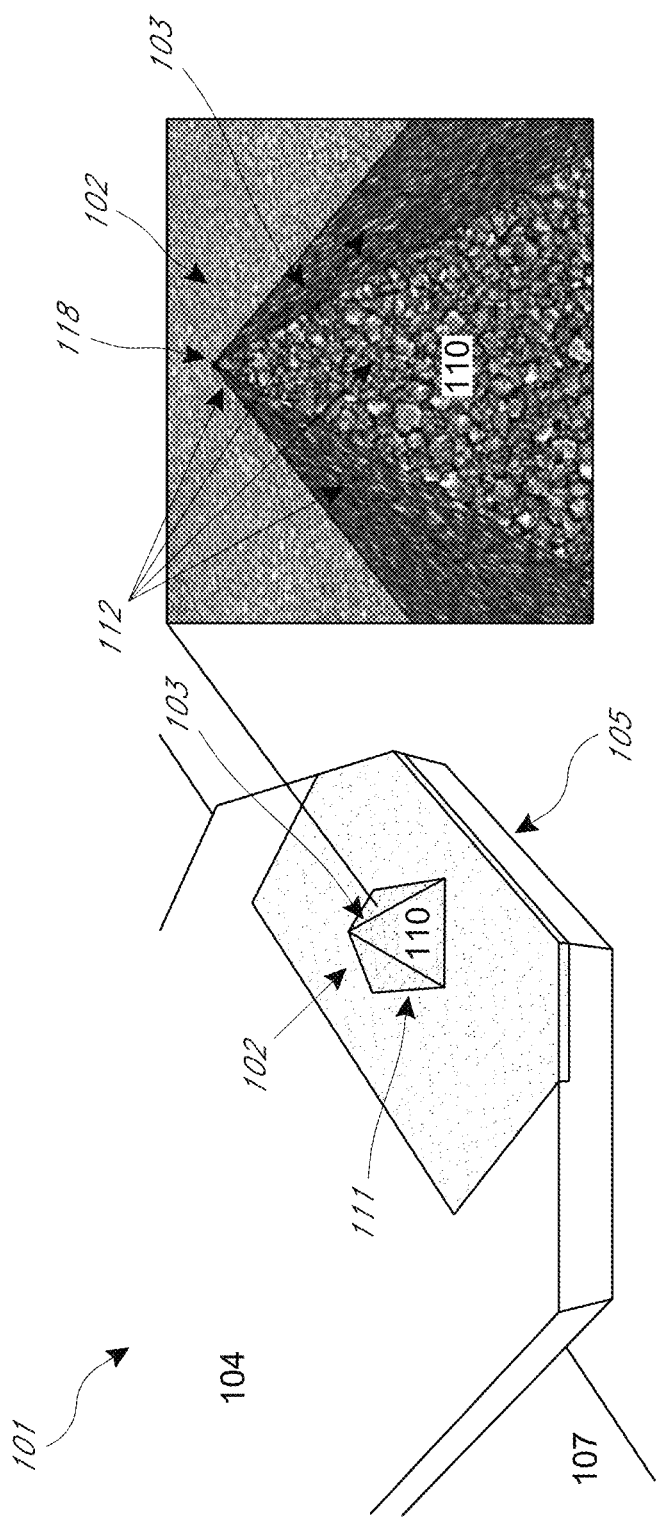
FIG. 8 is a schematic representation of a probe configuration (left) according to embodiments of the disclosed technology and a zoomed SEM image (right) of an apex of a probe configuration according to embodiments.

Referring to FIG. 8, whereas FIGS. 6A-6B and 7A-7B only show the tip 102 part of the probe configuration according to embodiments of the disclosure, the probe configuration 101 as a whole according to embodiments is schematically shown. The probe configuration 101 of FIG. 8 illustrates a holder 107 and a cantilever 104 that has a base end (not shown) attached to the holder 107, and a distal end 105 extending away from the holder 107, where a tip 102 is formed near the distal end 105 of the cantilever 104. As described herein, a tip 102 that is formed near the distal end 105 of the cantilever 104 is formed between about 1% to about 20% of a total length of the cantilever 104 away from the distal end 105. In the illustrated embodiment, the tip 102 has a pyramidal shape with four side surfaces 112 and a base plane 111, where the side surfaces extend from the base plane 111 and adjoin at the apex 118. However, other shapes of the tip 102 are possible as described with respect to FIG. 10. The illustrated tip 102 comprises a diamond body 110 that is covered with a thin diamond layer 103. In FIG. 8, the diamond body is not exposed because it is completely covered by the diamond layer 103. The diamond body 110, preferably made by a molding technique, is coated with a thin diamond layer or film 103. This results in a tip with superior mechanical stability (overcoming tip breaking), high electrical conductivity (due to the excellent conductivity properties of the diamond layer 103) and high spatial resolution (due to sharp diamond nanocrystals protruding from the apex 118). The resulting probe according to this embodiment is also referred to as overcoated diamond probe (ODP) comprising an overcoated diamond tip (ODT).

In some embodiments, the diamond body 110 is a solid diamond body (FIGS. 6B, 7B). In other embodiments, the diamond body 110 is a partially filled diamond body or a hollow diamond body (FIGS. 6A, 7A) wherein the diamond body 110 has a hollow inner region 1003 and a solid outer region.

For use as a scanning probe, the ODT is preferably integrated into a cantilever structure, comprising a cantilever 104 with the ODT attached near the distal end of the cantilever 104. The cantilever 104 can be made of a metal such as, for example, nickel, but also other materials may be used such as, for example, silicon, silicon nitride and diamond, among other materials.

In some embodiments, the diamond body 110 of the tip 102 is made by a molding process with the nucleation side or interfacial side of the diamond material, for the second diamond layer 103, at the apex side. The nucleation side or interfacial side of the diamond is the side which is in contact with the mold surface. It is the side where the diamond growth nucleates from the nanometer-size diamond seed crystals. The nucleation side of the resulting diamond body 110 is smooth (due to the molding process) and grain boundaries of the diamond crystals are present.

The nucleation side of the diamond body 110 is then covered at least partially at the apex region 108 or completely with a diamond layer or film 103. The overcoated diamond tip (ODT) according to embodiments of the disclosed technology uses the last grown diamond layer which is of higher quality compared to the nucleation side. The diamond-coated film 103 has sharp diamond crystals extending which is beneficial for tip resolution.

According to various embodiments, the thickness of the diamond layer 103 is in the range of about 5 nm to about 500 nm, or in the range between about 10 nm and about 500 nm, or in the range between about 50 nm and about 500 nm.

For embodiments for electrical SPM applications such as SSRM, both the diamond body 110 and the diamond layer 103 can be doped, e.g. using boron, phosphorus or using other dopants for diamond. However, in other embodiments, one of the diamond body 110 or the diamond layer 103 is doped while the other is undoped. That is, in some embodiments, the diamond body 110 is undoped while the diamond layer 103 is doped. In other embodiments, the diamond body 110 is doped while the diamond layer 103 is undoped. In embodiments where the diamond body 110 is doped while the diamond layer 103 is undoped, the resulting tip 102 can be used, for example, as a capacitive tip in capacitive atomic force microscopy (CAFM).

Yet in other embodiments, e.g., for non-electrical applications such as topography measurements, tribology, or nano-machining, both the diamond body 110 as well as the diamond film 103 may be undoped.

Figures 10A, 10B, 10C, 10D, 10E, 10F:
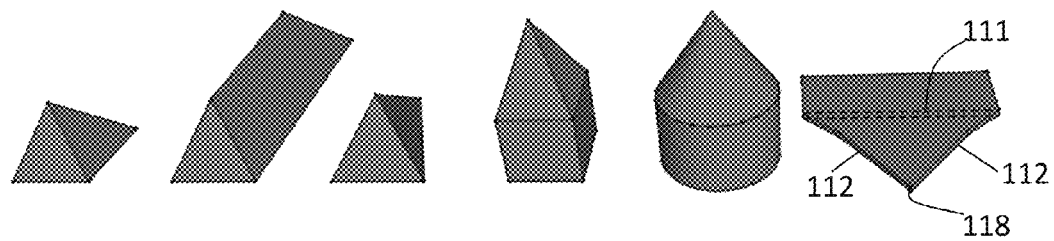
FIGS. 10A-10F schematically illustrate different example shapes of a tip of a probe configuration according to embodiments.

FIG. 10 illustrates different shapes that are possible for a tip similar to the tip 102 of FIGS. 6A-6B, 7A-7B and 8 of a probe configuration according to various embodiments. In one embodiment, the tip is pyramid-shaped (FIG. 10A), which can be obtained, e.g., by anisotropic etching to form a mold in a (100)-Si substrate, and thereafter filling the mold with diamond material to form the diamond body 110, releasing/underetching said diamond body and depositing the diamond layer 103 on at least a part of said diamond body (described in more detail further in this description). In another embodiment, the tip is knife-edge shaped (FIG. 10B), which can be obtained by etching a mold in a (100)-Si substrate and similarly forming a diamond body and diamond layer formed thereon. In another embodiment, the tip has a shape of a three-sided pyramid (FIG. 10C), which can be obtained from anisotropic etching of a mold in (311)-oriented Si substrates. The mold might also be defined using other materials than Si and dry etching approaches such as reactive ion etching (RIE) can be employed to obtain other mold shapes. The resulting tips can, according to embodiments, include high-aspect ratio tips with a tapered shape (FIG. 10D, 10E) and in-plane tips (FIG. 10F) which can have a base plane 111 and side surfaces 112 extending from the base plane up to the apex 118, whose shapes are typically used for nanoprobing.

FIGS. 11A-11F schematically illustrate a method of fabricating a probe configuration, according to some embodiments.

Figures 11A, 11B, 11C:
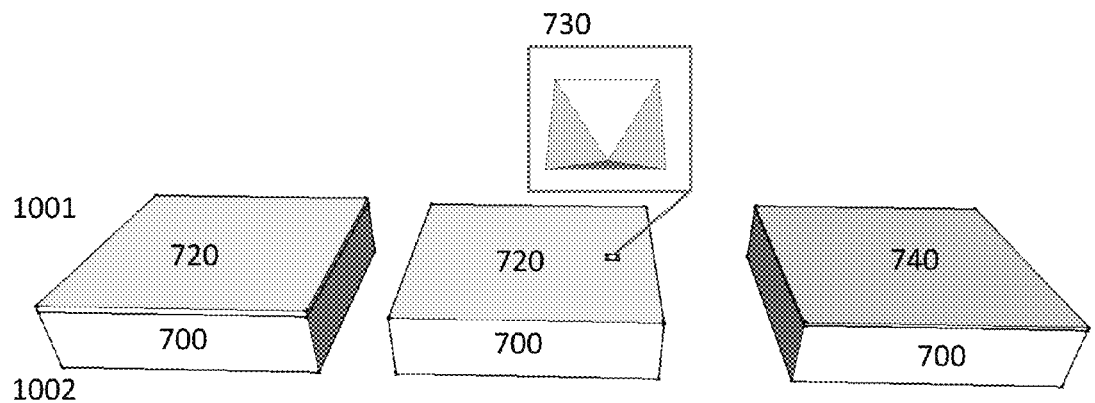
FIGS. 11A-11F are isomeric views of schematic intermediate structures illustrating various stages of fabrication of a tip of a probe configuration according to embodiments.

Referring to FIG. 11A, a substrate 700 is provided. The substrate 700 may be a semiconductor wafer, for instance a (100)-Si wafer and has a top side 1001 and a back side 1002. For patterning the substrate, a hardmask 720 can be provided on the top side 1001 of the substrate 700. The hardmask 720 may, for example, comprise $SiO_2$ or $Si_3N_4$.

Referring to FIG. 11B, the substrate 700 is patterned using the hardmask 720 thereby creating a recessed mold 730 in the substrate 700. The mold can be formed by, e.g., etching from the top side 1001 of the substrate 700. That is, the mold 730 is created on the top side 1001 of the substrate 700. The mold 730 has a shape which will define the final shape of the tip, which can include a probe body having an apex region. In FIG. 11B, for example, an inverted pyramid-shaped mold is etched into the (100)-Si wafer. However, the mold 730 can have any suitable shape described above with respect to FIG. 10. One of various etchants for wet-etching to form the mold 730 is potassium hydroxide (KOH). The mold 730 may be further shaped for a sharper apex by a low temperature oxidation. The hard mask 720 is removed after forming the mold 730.

Referring to FIG. 11C, after providing the mold 730 and removing the hard mask 720, a first diamond layer 740 is provided on the surface of the substrate 700 which includes the mold 730 (at the top side 1001). The diamond material of the first diamond layer 740 is thus also provided in the mold 730 to at least partially fill the mold 730. Providing the first diamond layer 740 may be done using deposition techniques such as, for example, chemical vapor deposition (CVD), atomic layer deposition (ALD) or physical vapor deposition (PVD).

Figures 11D, 11E, 11F:
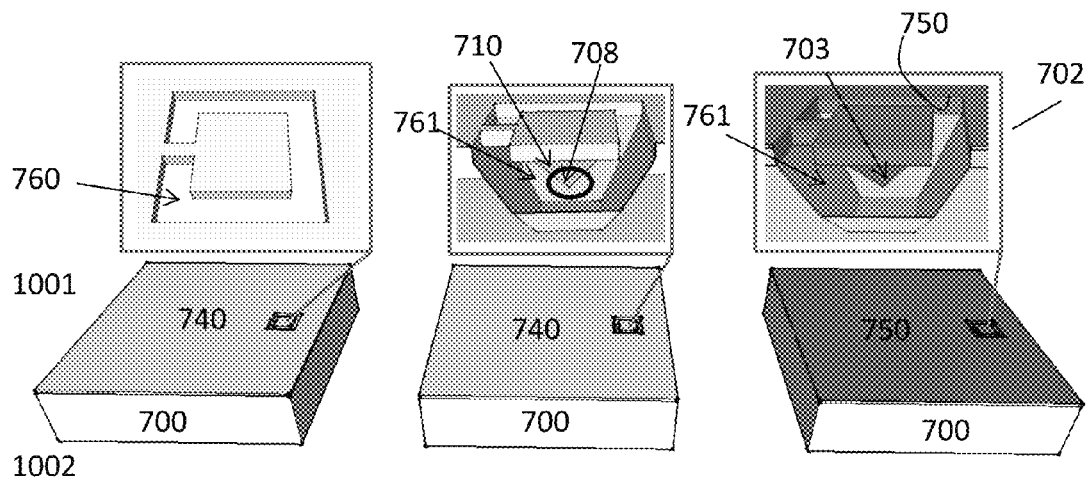

Referring to FIG. 11D, using another patterned hardmask layer 721 (not shown in FIG. 11 but shown later in FIG. 18) that is provided on the first diamond layer 740, the first diamond layer 740 is patterned or etched using, e.g., a dry etching technique such as, for example, reactive ion etching (RIE), thereby forming a diamond body of the tip and creating a cavity 760 which partially surrounds the first diamond layer formed in the mold 730. The cavity 761 partially but not completely surrounds the first diamond layer formed in the mold because a connector keeps the diamond layer of the mold connected to the remaining outer first diamond layer. This is done from the top side 1001 of the substrate. The Si-substrate is not etched in this step but etched later on to release the tip. In some implementations, patterning the first diamond layer 740 includes selectively etching the first diamond layer 740 such that the etch process stops on the surface of the underlying substrate 700. Etch selectivity may be selected such that the removal rate ratio of the first diamond layer 740 to the underlying substrate 700 can be chosen to exceed 10, 100 or 1000.

As described above with respect to FIGS. 6B and 7B, in some embodiments, the diamond body may be a solid diamond body that is formed of the first diamond layer material. In some other embodiments, as described with respect to FIGS. 6A and 7B, the diamond body may be a partially filled diamond body or a hollow diamond body, where the diamond body includes a hollow inner region 1003 and a solid outer region that is formed of the first diamond layer material.

Referring to FIG. 11E, an underetching-releasing process is performed to release the diamond body 710 (made of the first diamond layer 740) of the tip from the substrate 700 at the apex region 708, by underetching the underlying substrate 700 from the top side 1001. As used herein, underetching refers to a process in which a selective etchant removes exposed regions of a material which underlies a patterned layer, while areas that remain covered by the patterned layer remain intact. Removing the underlying material can result in formation of a cavity or a trench adjacent the covered regions. In the illustrated embodiment of FIG. 11E, an underlying material of the substrate 700 is removed from exposed regions of the substrate 700 formed by the cavity 760 (FIG. 11D) of the first diamond layer, which at least partially surrounds the diamond body 710, such that the diamond body 710 becomes separated from the substrate material of the mold 730 to which the diamond body 710 previously was in contact with. It will be appreciated that, in FIG. 11E, the etchant, while etching into the substrate to form cavities or trenches therein, may also removes a sufficient amount of the substrate material laterally such that a cavity or a recessed portion 761 formed in the substrate 700 completely surrounds the diamond body at least at an apex region 708. In some implementations, the diamond body 710 including the apex region 708 does not directly contact the substrate material, other than through the connector connecting to the remaining first diamond layer 740. That is, the etchant removes the material of the substrate 700 under the connector connecting the diamond body 710 with the remaining first diamond layer that remains after forming the cavity 760 (FIG. 11D). This underetching and releasing processes can employ a relatively anisotropic etching process such as, for example, a wet etching process using KOH. The diamond body 710 with pyramidal shape is thereby completely released at the apex region 708, thereby leaving the cavity 761 in the substrate 700. In the illustrated embodiment, the releasing process is performed from the top side 1001. However, other embodiments are possible such as, as described later, where the releasing process is performed from the back side 1002 of the substrate.

Referring to FIG. 11F, after releasing the diamond body 710, a second diamond layer 750 is provided on the structure. The second diamond layer 750 may be provided using deposition techniques such as chemical vapor deposition (CVD) or atomic layer deposition (ALD). The second diamond layer 750 is relatively thin with a thickness in the range between about 5 nm and about 500 nm, or between about 50 nm and about 300 nm. Because the second diamond layer 750 is formed using a deposition technique such as CVD or ALD, the second diamond layer 750 is thus also formed on top of the diamond body 710 on the nucleation side. During this step at least the apex region 708 of the diamond body is covered by the thin second diamond layer 750. FIG. 11F is a schematic example of an embodiment wherein the diamond body 710 is completely covered with the second diamond layer 750. The resulting structure is a tip 702 consisting of a diamond body 710 and covered or coated at least partially at the apex region by a thin diamond layer 703.

As a limit at least one single diamond grain may be placed at the tip apex in the second diamond layer deposition step, as this single diamond grain is sufficient to make a physical and electrical contact with the sample.

Alternatively, only a bottom region of the mold 730 (which will be the apex region of the tip) is filled with the first diamond layer 740. This may be done by a selective seeding process and growth step. Thereafter the remaining part of the mold is filled with another material such as for example $Si_3N_4$. The partial diamond body is then etched and released from the substrate. After tip release, the second diamond layer 750 is selectively deposited/grown on the apex region of the tip which is the part of the tip consisting of the first diamond layer material.

Figure 18A:
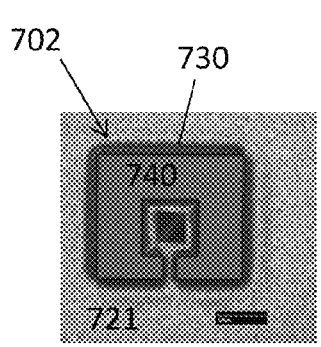
FIGS. 18A-18C are SEM images of intermediate structures of a probe configuration at various stages, according to embodiments.
Figure 18B:
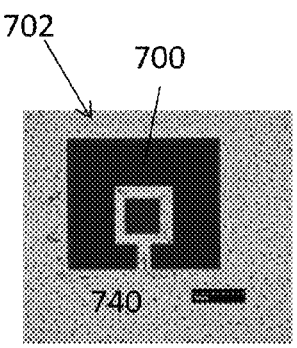
Figure 18C:
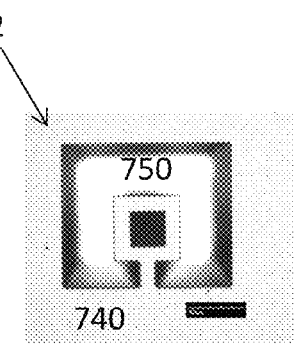

FIGS. 18A-18C are electron micrographs of a tip configuration 702 at various stages of fabrication according to embodiments similar to those described above with respect to FIGS. 11A-11F. FIG. 18A is an electron micrograph of the tip 702 having a patterned hardmask 721 on top of a first diamond layer 740 deposited into a pyramidal mold 730, similar to the embodiment described above with respect to FIG. 11C. FIG. 18B is an electron micrograph of the tip 702 having he patterned first diamond layer 740, after the hardmask 721 has been removed, similar to the embodiment described above with respect to FIG. 11D. The exposed Si-substrate 700 is visible. In FIG. 18B, the tip is not released yet. FIG. 18C is an electron micrograph of the tip 702 showing the tip after coating the diamond pyramid onto the nucleation side with the second diamond layer 750, similar to the embodiment described above with respect to FIG. 11F.

The second diamond layer 750 has a thickness which is smaller than the thickness of the first diamond layer 740. According to various embodiments, the first diamond layer 740 has a thickness in the range of 100 nm to 10 μm, 100 nm to 5 μm, or 500 nm to 5 μm. According to various embodiments, the second diamond layer 750 has a thickness in the range of about 5 nm to about 500 nm, in the range between about 10 nm and about 500 nm, in the range between about 50 nm and about 500 nm, or in the range between about 5 nm and about 100 nm.

The first and/or second diamond layer may comprise microcrystalline diamond (MCD), which has as an advantage to have a superior electrical conductivity. Other types of diamond material such as nanocrystalline diamond (NCD), ultra-nanocrystalline (UNCD) and diamond-like-carbon (DLC) might be used as well.

It will be appreciated that, as a result of the foregoing processing steps to arrive at the probe configurations, the first and second diamond layers may be distinguishable even though both may be diamond-based. For example, one of the first and second diamond layers may have an average grain size and/or or electrical conductivity that may be higher than the other by, for example, at least 1%, at least 10%, or at least 25%. Furthermore, referring back to FIGS. 6A-6B and 7A-7B, a boundary may be made visible between the first diamond layer 110 and the second diamond layer 103, for example, using techniques such as electron microscopy.

To complete the method of manufacturing the probe configuration, the tip 702 can be attached to a cantilever 704 and this may be done as schematically shown in FIGS. 12A-12H.

Referring to FIGS. 12A and 12B, after providing the second diamond layer 750 on the tip 702 (FIG. 11F), the cavity or the recessed portion 761 of the resulting tip structure (FIG. 12A) may be filled with a sacrificial layer 910 (e.g. by deposition or spinning) and subsequently planarized (for example by chemical mechanical polishing (CMP)) (FIG. 12B). The sacrificial material 910 may be an oxide or a polymer. For example silicon oxide, spin-on-glass or BCB may be used.

Referring to FIG. 12C, after planarizing the sacrificial layer 910, a hardmask 920 is used to define a tip area and the first diamond layer 740 and the second diamond layer 750 are patterned, using an etching process such as RIE. The hardmask 920 corresponds at least to the outer circumference of the planarized sacrificial material 910. As a result, parts of the first and second diamond layers 740, 750 surrounding the tip area are removed.

Referring to FIG. 12D, after removal of the hardmask 920, the cantilever 704 is patterned on top of the overcoated tip using another hardmask (not shown) and a deposition step such as for example Ni electroplating for a Ni cantilever. The tip 702 is thereby attached to the cantilever 704 at one end, whereas the cantilever is patterned at the other end with a cantilever membrane 7041, which has a larger width than the cantilever 704 beam, and adapted for attaching the cantilever 704 to a probe holder at a subsequent process (FIG. 12G).

Referring to FIGS. 12E-12F, after patterning the cantilever 704, the cantilever 704 and the overcoated tip (not visible) are underetched (FIG. 12E) and the cantilever membrane 7041 structure is peeled off using a needle 960 (FIG. 12F).

Referring to FIGS. 12G-12H, after peeling off the cantilever membrane 7041, a probe holder 707 is fixed to the cantilever 704 via the cantilever membrane 7041 (FIG. 12G), and finally the probe configuration is removed from the wafer (FIG. 12H).

Figure 13:
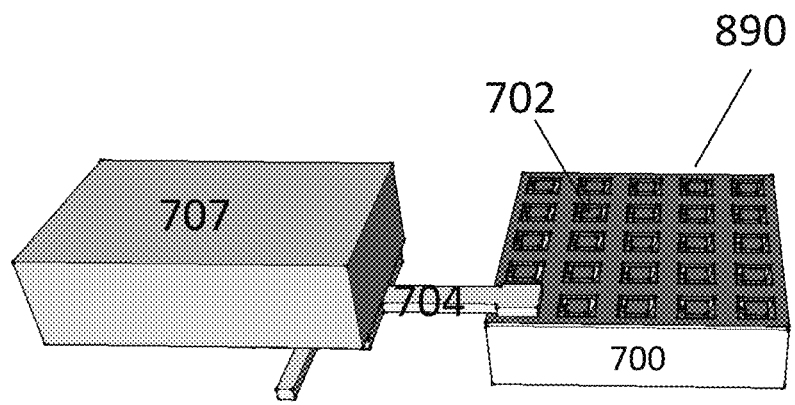
FIG. 13 is a schematic representation of an array of overcoated tips according to embodiments.

FIG. 13 illustrates an array 890 of overcoated tip structures 702 that are fabricated on a substrate 700, according to embodiments of the disclosed technology. Such array 890 can have a high packing density, e.g. about 30000 to 100000 structures on a 200 mm wafer. The cantilever 704 of the probe fabrication can be fabricated by a separate procedure avoiding more complex and challenging integration procedures. As such, the separate cantilever fabrication 704 and the array of overcoated tip structures 890 has the advantage of a cost-efficient probe fabrication.

Figure 14:
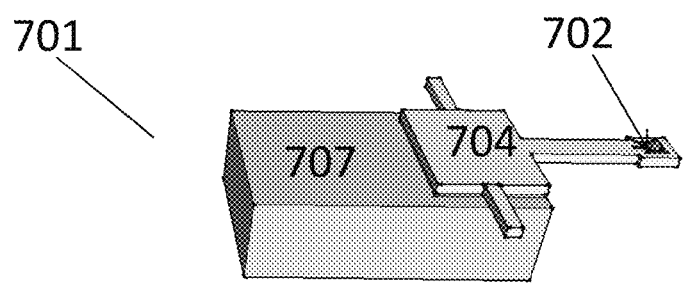
FIG. 14 is a schematic representation of a probe configuration manufactured according to embodiments.

FIG. 14 illustrates a procedure in which a tip 702 as fabricated according to embodiments described above may be attached to a cantilever 704 by a bonding process using a gluing step. For example a metal cantilever may be glued with conductive silver epoxy onto a tip 702. This might be done manually or by an automated assembly procedure (e.g. using robotics). The result of this assembly step is a probe configuration 701 according to embodiments of the disclosed technology comprising a cantilever 704 and a tip 702 attached at the end of the cantilever 704. The cantilever 704 may be attached to a holder 707.

FIGS. 15A-15K illustrate an alternative method for fabricating the probe configuration according to a third aspect. For this manufacturing method the probe configuration is mainly formed from the back side 1002 of the substrate (wafer), wherein in FIG. 11 the probe configuration is mainly formed from the top side 1001 of the substrate (wafer).

Referring to FIG. 15A, a substrate 700 is provided. The substrate 700 may be a (100)-Si wafer and has a top side 1001 and a back side 1002. For patterning the substrate 700, a hardmask 720 is provided on the top side 1001 of the substrate 700. The hardmask 720 may for example comprise $SiO_2$ or $Si_3N_4$.

Referring to FIG. 15B, the substrate 700 is patterned using the hardmask 720 thereby creating a mold 730 in the substrate 700 (at the top side 1001). The mold has a shape which will define the final shape of the tip. In FIG. 15B for example an inverted pyramid-shaped mold is etched into the (100)-Si wafer. As described above with respect to FIG. 11B, other shapes of the mold are possible for producing various shapes of tips as illustrated in FIG. 10. Etching may include, for example, a wet etching process, such as KOH etching. The mold may be further shaped for a sharper apex by a low temperature oxidation. Any remaining hardmask 720 may be removed after forming the mold 730.

Referring to FIG. 15C, after providing the mold 730 and removing the hardmask 720, a first diamond layer 740 is provided on the structure from the top side 1001. The diamond material of the first diamond layer 740 is thus also provided in the mold 730. Providing the first diamond layer 740 may be done using deposition techniques such as for example chemical vapor deposition (CVD), atomic layer deposition (ALD) or physical vapor deposition (PVD).

Referring to FIG. 15D, another hardmask layer (not shown) is provided on the first diamond layer and the first diamond layer 740 is patterned using this hardmask. The first diamond layer 740 is thus etched in this patterning step thereby forming the diamond body of the tip. The etching may be done using a dry etching technique such as for example reactive ion etching (RIE). Thereby a diamond body of the tip 702 is formed. The diamond body is thus formed from the top side 1001 of the substrate 100. Unlike FIG. 11D, the first diamond layer 740 which surrounds the mold 730 is completely removed to form an island of the first diamond layer.

The diamond body may be a solid diamond body (FIG. 6B, 7B) completely consisting of the first diamond layer material or the diamond body may be a partially solid diamond body or hollow diamond body (FIG. 6A, 7A) wherein the diamond shape comprises a hollow inner region and a solid outer region, the solid outer region consisting of the first diamond layer material.

Referring to FIG. 15E, from the back side 1002 of the substrate 700, a releasing-etching process is performed to release the tip 702 from the substrate 700 at the apex region 708. This releasing-etching process is performed using an anisotropic etching process, for example wet etching process such as KOH etching. The diamond body 710 with pyramidal shape is thereby at least partially released at the apex region 708. In this step, the apex region 708 of the diamond body is underetched from the back side of the substrate, leaving only said apex region extending from the remaining substrate material (see the small point indicated by the numeral 708 and shown enlarged in each of the FIGS. 15E-F-G).

Referring to FIG. 15F, a second diamond layer 750 is provided on the released (i.e. underetched) structure (i.e. on the apex region 708) from the back side 1002 of the wafer. The second diamond layer 750 may be provided using deposition techniques such as CVD. The second diamond layer 750 is rather thin with a thickness in the range of 5-500 nm, more preferably in a range of 50-300 nm. The second diamond layer 750 is thus also formed on top of the diamond body 710 on the nucleation side. During this step at least the apex region 708 of the diamond body 710 is covered by the thin second diamond layer 750.

Referring to FIGS. 15G-15K, the resulting structure is then integrated onto a cantilever structure 704 (with a cantilever membrane 7041) by patterning and deposition (for example sputtering and electroplating) (FIG. 15G) and the cantilever 704 and overcoated tip structure 702 are then released (for example by wet etching) (FIG. 15H). The cantilever membrane 7041 is then peeled off (FIG. 15I) using a needle 760 and a probe holder 707 is fixed to the cantilever membrane 7041 (FIG. 15J), and finally the probe configuration 701 is removed from the substrate 700 (FIG. 15K). The resulting structure at the end of the cantilever 704 is a tip 702 consisting of a diamond body 710 and covered at least partially at the apex region by a thin diamond layer 703.

Alternatively only a bottom region (which will be the apex region of the tip) is filled with the first diamond layer 740. This may be done by a selective seeding process and growth step. Thereafter the remaining part of the mold is filled with another material such as for example $Si_3N_4$. The partial diamond body is then etched and released from the substrate. After tip release the second diamond layer 750 is selectively deposited/grown on the apex region of the tip from the backside of the wafer (which is part of the tip consisting of the first diamond layer material).

The cantilever 704 of the probe configuration 701 preferably comprises a metal such as, for example, Ni. However also other materials may be used such as for example silicon, diamond, silicon oxide, silicon nitride.

The method for fabricating a probe configuration according to embodiments as described in FIG. 11-12 has the advantage over the method for fabricating a probe configuration according to embodiments as described in FIG. 15 that a smaller base width may be used (about a minimum base width of 7×7 $\mu m^2$ compared to 20×20-40×40 $\mu m^2$).

Figures 16A, 16B:
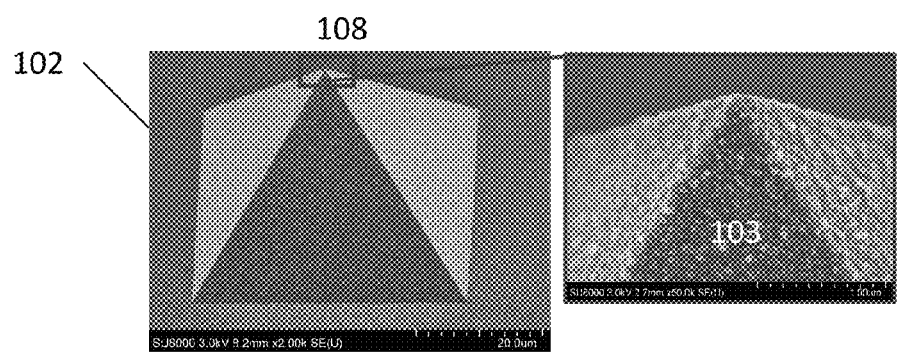
FIGS. 16A-16B and 17A-17C are SEM images of overcoated tips according to embodiments.

FIGS. 16A-16B are scanning electron microscopy (SEM) images of an overcoated tip 102 according to embodiments of the disclosed technology and manufactured according to embodiments of the disclosed technology (FIG. 16A). The base plane of the tip is 40×40 $\mu m^2$. The inset (FIG. 16B) shows a more zoomed SEM image of the apex region 108 of the overcoated tip 102. Sharp protruding diamond crystals of the diamond coating 103 are clearly visible at the surface of the apex region.

Figures 17A, 17B, 17C:
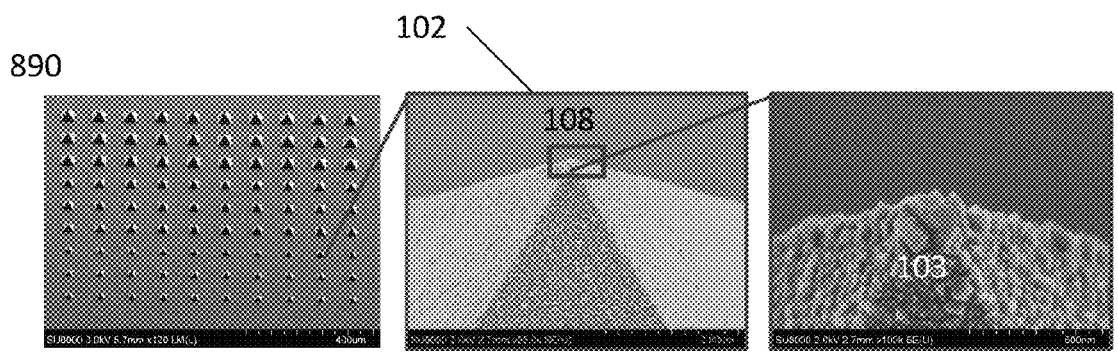

FIG. 17A is an SEM image of an array 890 of overcoated tips as manufactured according to embodiments of the disclosed technology. Three different base widths of the tip are manufactured: bottom three rows have a base width of 20 $\mu m$, middle three rows have a base width of 30 $\mu m$ and the upper three rows have a base width of 40 $\mu m$. FIG. 17B and FIG. 17C are zoomed SEM images of one of the overcoated tips at the apex region 108, analogue to the SEM image of FIG. 16. Again the sharp diamond crystals of the diamond layer 103 are clearly visible.

The overcoated tips as shown in FIGS. 17A-17C were manufactured using a first diamond layer with a thickness of about 1 $\mu m$. The second diamond layer has a thickness of about 150 nm. In different experiments, the diamond thickness of the second diamond film was varied between 50 and 150 nm.

Figure 19A:
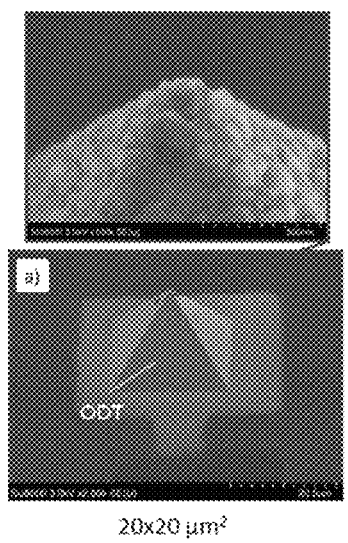
FIGS. 19A-19C are SEM images of fabricated probe configurations having different base widths, according to embodiments.
Figure 19B:
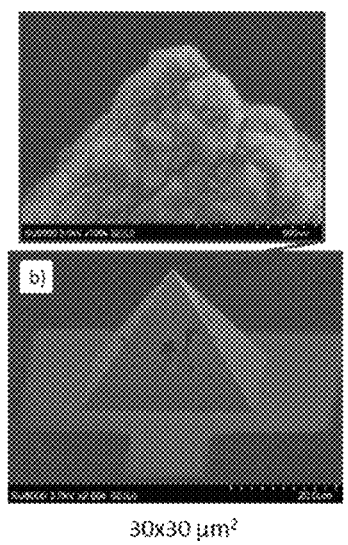
Figure 19C:
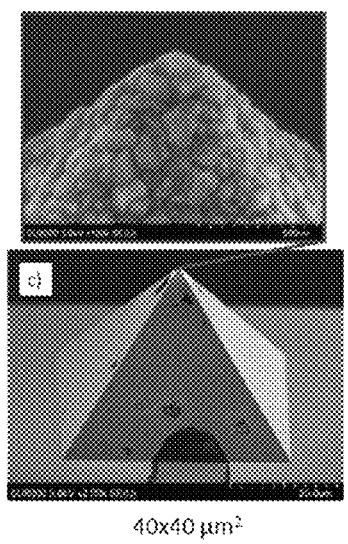

FIGS. 19A-19C are SEM images of fabricated probe configurations according to embodiments of the disclosed technology with a base width of 20 $\mu m$ (FIG. 19A), 30 $\mu m$ (FIG. 19B), and 40 $\mu m$ (FIG. 19C). Top images show a zoomed image of the apex region 108 of the tips 102 shown in the bottom images. The method according to embodiments as described in FIG. 11 was used. The diamond crystals of the diamond layer coated on the diamond body are clearly visible.

Figure 20A:
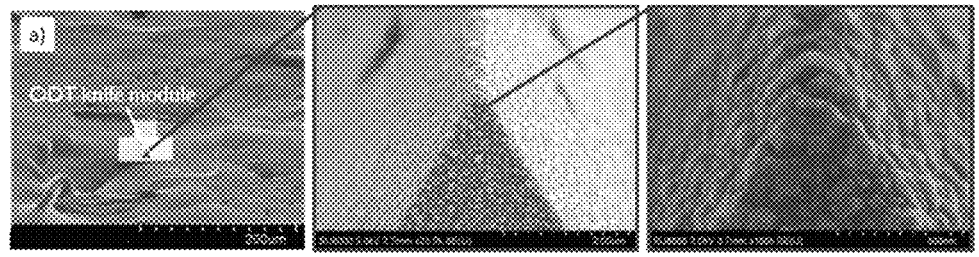
FIG. 20A is an SEM image of fabricated probe configuration having a knife-shape, according to embodiments.
Figure 20B:
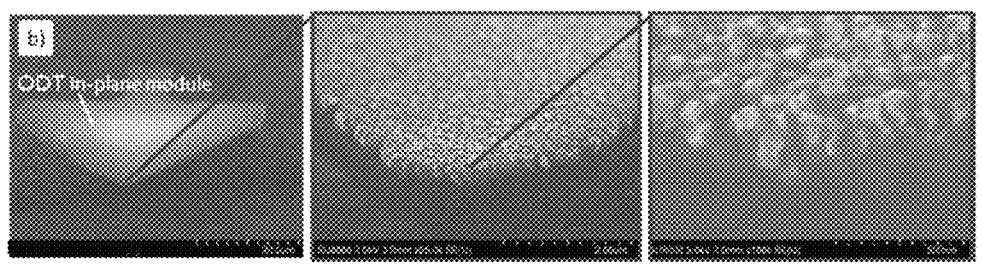
FIG. 20B is an SEM image of fabricated probe configuration having an in-plane shape, according to embodiments.

FIGS. 20A-20B are SEM images of fabricated probe configurations according to embodiments of the disclosed technology which have a knife-shape (FIG. 20A) and an in-plane shape (FIG. 20B). From left to right more zoomed SEM images are shown from the apex region.

Figure 21A:
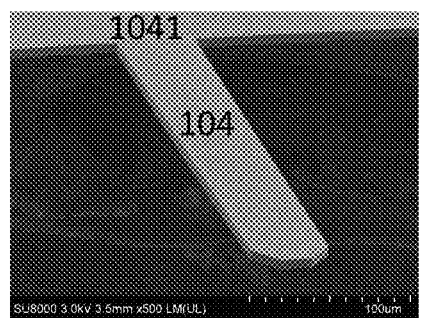
FIGS. 21A-21B are SEM images of fabricated probe configurations according to embodiments.
Figure 21B:
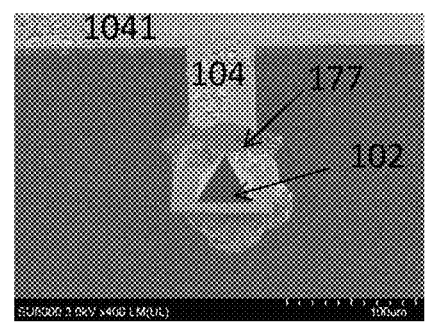

FIGS. 21A-21B are SEM images of fabricated probe configurations according to embodiments of the disclosed technology assembled according to the method as described in FIG. 14 (i.e. by gluing). A tip-less Ni cantilever 104 is used and is bonded onto a pyramidal overcoated tip 102 module using silver epoxy 177. FIG. 21A shows a cantilever 104 (with cantilever membrane 1041 at one end) fabricated separately. In FIG. 21B the probe configuration is shown wherein the overcoated tip 102 is glued to the cantilever using silver epoxy.

Figures 22A, 22B, 22C:
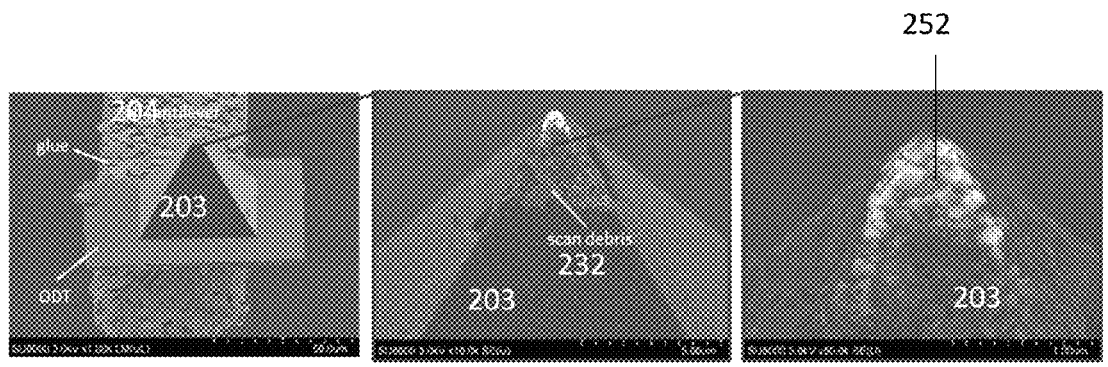
FIGS. 22A-22C are SEM images of fabricated probe configurations, after scanning with SSRM, according to embodiments.

FIGS. 22A-22C are SEM images at three different zoom levels (A, B, C and higher zoom factor from left to right) of fabricated probe configurations (cantilever 204 with tip 203 glued to it) according to embodiments of the disclosed technology which is scanned in SSRM mode for several hours on a Si substrate sample at GPa pressures. Although Si debris (232) from scanning can be seen (FIG. 22B), all diamond nanocrystals 252 of the diamond layer 203 are still in place (FIG. 22C).

The Si substrate, which is scanned, comprises Si calibration structures having a staircase doping profile. From SSRM experiments performed with overcoated tips according to embodiments of the disclosed technology, it could be shown clearly that the tips do not suffer from tip breaking. The zoom-in image (FIG. 22C) illustrates further that there is no visible wear of the nanocrystals in contact during the measurements which emphasizes the high bonding strength of the overcoated crystals onto the first diamond layer.

Figure 23A:
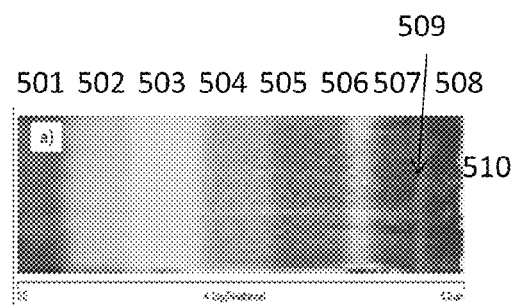
FIG. 23A is a two-dimensional (2D) SSRM image of a p-type Si staircase calibration structure, according to embodiments.
Figure 23B:
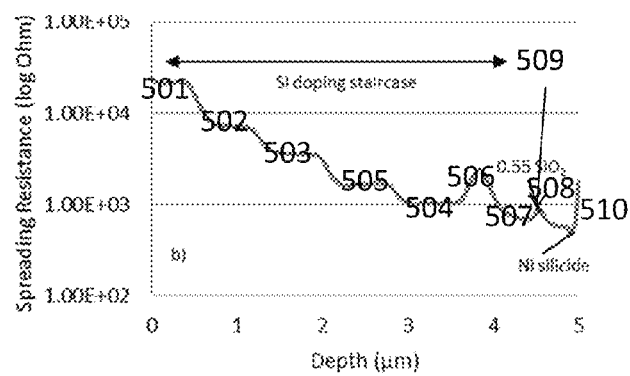
FIG. 23B is an averaged line profile of the 2D SSRM image of FIG. 23A, measured with a probe configuration according to embodiments.

FIG. 23A is a two-dimensional (2D) SSRM image and FIG. 23B illustrates an averaged line profile of the 2D SSRM image of FIG. 23A, taken on a special p-type Si staircase calibration structure. The structure involves differently doped Si regions ranging from about $4\times10^{16}$ at/cm$^3$ to $5\times10^{19}$ at/cm$^3$, a 0.55 nm wide silicon oxide layer and a 25 nm wide Ni silicide layer. The SSRM image clearly shows all doped regions (501, 502, 503, 504, 505, 506, 507, 508). The oxide peak 509 and the silicide region 510 are also observed.

Figure 24:
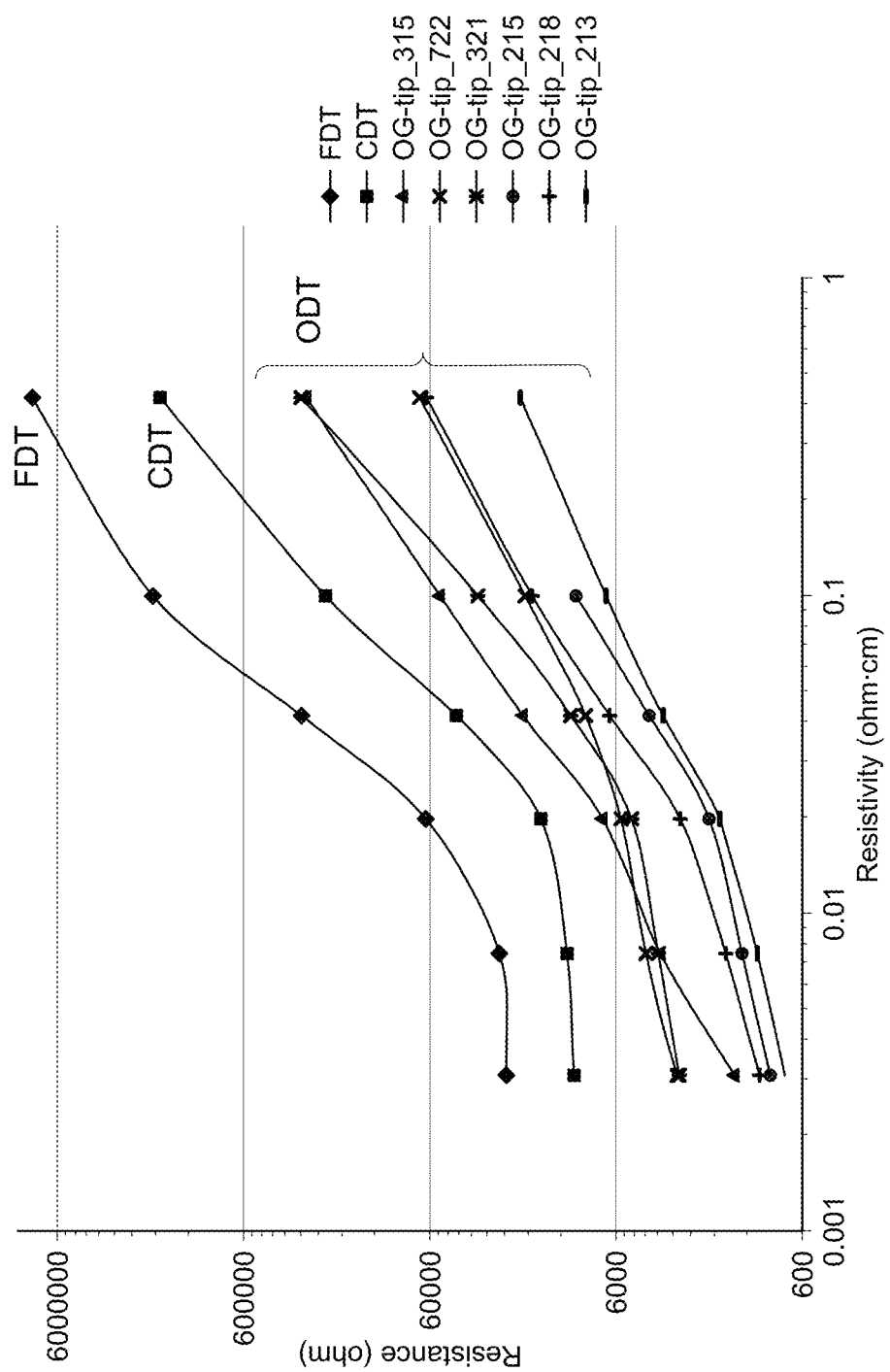
FIG. 24 illustrate experimental calibration curves of six different overcoated diamond tips (ODT) according to embodiments.

FIG. 24 shows the calibration curves made from a prior art full diamond probe FDT, a prior art diamond-coated probe CDT and six different overcoated tips ODT according to embodiments of the disclosed technology. The calibration curves illustrate the higher dynamic range of the ODT tips compared to CDT and FDT. This can be seen by evaluating the slope of the curves. The FDT tip shows a shallow slope at the highly doped region illustrating its lower conductivity (albeit highest sharpness). The CDT shows a slightly steeper slope than the FDT. The ODT clearly shows the highest dynamic range and a steeper slope in the highly doped regions, which is a clear advantage compared to prior art probes.

Figure 25A:
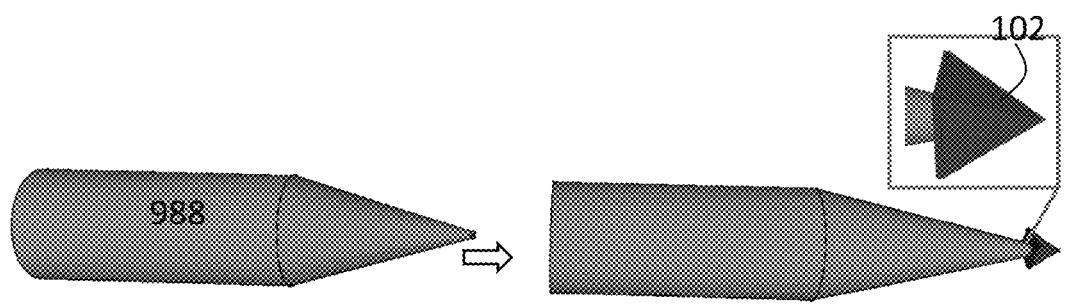
FIGS. 25A-25B are schematic representations of probe configurations adapted for nanoprobing, according to embodiments.
Figure 25B:
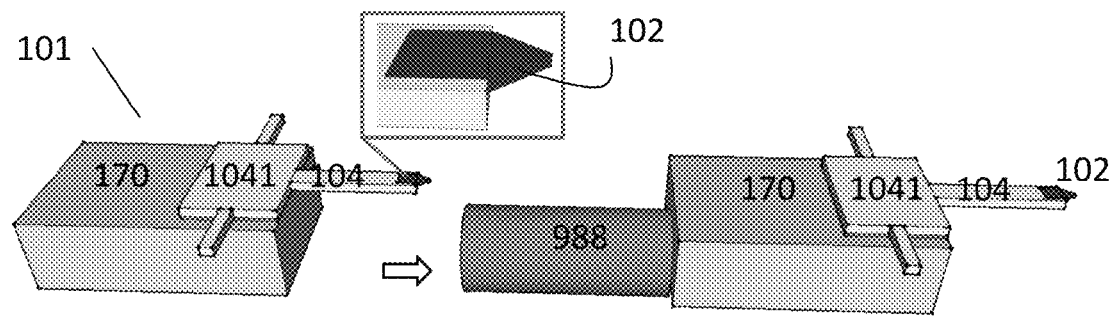

FIGS. 25A-25B illustrate that besides the application of overcoated tips in SPM, overcoated tips according to the disclosure can also be used for nanoprobing. FIG. 25A shows an overcoated tip 102 according to embodiments of the disclosed technology glued at the end of a tapered needle structure 988. The tapered needle structure 988 which may be seen as the cantilever of the probe configuration is usually a tungsten wire. Thereto at the end of the tungsten wire a tip 102 according to embodiments of the disclosed technology may be attached.

FIG. 25B shows a probe configuration 101 with a mounting holder 170, a cantilever structure 104, 1041 and an integrated overcoated in-plane tip 102 which is glued to a wire needle 998 for mounting to a micromanipulator.

Nanoprobing commonly uses micromanipulators, often also called nanomanipulators, with sharp needle-like tips. These tips are commonly electro-chemically etched tungsten-wire tips. Various embodiments of the disclosed technology can also be used for such nanoprobing applications. FIG. 25B illustrates that for example in-plane ODT attached to the end of a cantilever structure can be used for this or for example a pyramidal ODT can be attached directly to the end of a metal needle, e.g. etched tungsten wire tip (FIG. 25A). Such ODT structures in nanoprobing allow for measurements which are not possible with common tungsten wire tips, e.g. electrical probing of hard semiconductors like Si and Ge, and the local material removal of hard materials on the nano- and micro-meter scale.

For the fabrication of a pyramidal diamond tip for nanoprobing according to FIG. 25A, first a substrate is provided. The substrate may be a (100)-Si wafer. For patterning the top side of the substrate, a hardmask is provided on the top side of the substrate. The hardmask may for example comprise $SiO_2$ or $Si_3N_4$. The substrate is patterned using the hardmask thereby creating a mold in the substrate. The mold is thus created by etching from the top side of the substrate. In other words, the mold is created on the top side of the substrate. The mold has a shape which will define the final shape of the tip; for example an inverted pyramid-shaped mold is etched into the (100)-Si wafer. For example a wet etching may be used for providing the mold, such as KOH etching. The mold may be further shaped for a sharper apex by a low temperature oxidation.

After providing the mold, a first diamond layer is provided on the structure (at the top side). Before providing the first diamond layer the hardmask may be removed. The diamond material of the first diamond layer is thus also provided in the mold. Providing the first diamond layer may be done using deposition techniques such as for example chemical vapor deposition (CVD).

Next, another patterned hardmask layer is provided on the first diamond layer and the first diamond layer is etched by a dry etching technique such as for example reactive ion etching (RIE) thereby forming a diamond body of the tip and creating a cavity around the first diamond layer of the mold. This is done from the top side of the substrate. The Si-substrate is not etched in this step.

The diamond body may be a solid diamond body completely consisting of the first diamond layer material or the diamond body may be a partially solid diamond body or hollow diamond body wherein the diamond shape comprises a hollow inner region and a solid outer region, the solid outer region consisting of the first diamond layer material.

In a following step a releasing etching step is performed to release the diamond body (made of the first diamond layer) of the tip from the substrate at the apex region by underetching from the top side of the substrate. This underetching and releasing etching step is preferably an anisotropic etching step for example wet etching such as KOH etching. The diamond body with pyramidal shape is thereby completely released at the apex region leaving a recessed part in the substrate.

Thereafter, a second diamond layer is provided on the structure. The second diamond layer may be provided using deposition techniques such as CVD. The second diamond layer is rather thin with a thickness in the range of 5-500 nm, more preferably in a range of 50-300 nm. The second diamond layer is thus also formed on top of the diamond body on the nucleation side. During this step at least the apex region of the diamond body is covered by the thin second diamond layer. The resulting structure is a tip consisting of a diamond body and covered or coated at least partially at the apex region by a thin diamond layer.

The resulting ODT may be arranged into an array as shown in FIG. 13. The ODT is then attached to a tapered metal needle by a gluing step. The resulting ODP shown in FIG. 25A can then be used in nanoprobing.

For the fabrication of an in-plane diamond tip adapted for nanoprobing according to FIG. 25B, first a substrate is provided. The substrate may be a (100)-Si wafer. A first diamond layer is provided on the top side of the substrate. Providing the first diamond layer may be done using deposition techniques such as for example chemical vapor deposition (CVD). Next, a patterned hardmask layer defining the shape of an in-plane tip as shown in FIG. 10F is provided on the first diamond layer and the first diamond layer is etched by a dry etching technique such as for example reactive ion etching (RIE) thereby forming a diamond body of the tip and creating a cavity around the first diamond layer of the in-plane tip. This is done from the top side of the substrate. The Si-substrate is not etched in this step.

In a following step a releasing etching step is performed to release the diamond body (made of the first diamond layer) of the in-plane tip from the substrate, by underetching from the top side of the substrate. This underetching and releasing etching step is preferably an anisotropic etching step for example wet etching such as KOH etching. The diamond body with in-plane tip shape is thereby completely released at the apex region leaving a recessed part in the substrate.

Thereafter, a second diamond layer is provided on the structure. The second diamond layer may be provided using deposition techniques such as CVD. The second diamond layer is rather thin with a thickness in the range of 5-500 nm, more preferably in a range of 50-300 nm. The second diamond layer is thus also formed on top of the diamond body on the nucleation side. During this step at least the apex region of the diamond body is covered by the thin second diamond layer. The resulting structure is an in-plane tip consisting of a diamond body and covered or coated at least partially at the apex region by a thin diamond layer.

To complete the method of manufacturing the in-plane probe configuration, the in-plane tip needs to be attached to a cantilever. After providing the second diamond layer on the in-plane tip, the recessed part of the resulting in-plane tip structure may be filled with a sacrificial layer (e.g. by deposition or spinning) and is planarized (for example by chemical mechanical polishing (CMP)). The sacrificial material may be an oxide or a polymer. For example silicon oxide, spin-on-glass or BCB may be used.

A hardmask is then used to define a tip area and the first and second diamond layer are patterned, using an etching step such as RIE. The hardmask corresponds at least to the outer circumference of the planarized sacrificial material. As a result, parts of the first and second diamond layers surrounding the tip area are removed. After removal of the hardmask, the cantilever is defined on top of the overcoated tip using another hardmask and a deposition step such as for example Ni electroplating for a Ni cantilever. The tip is hereby attached to the cantilever at one end, whereas the cantilever is patterned at the other end with a so-called cantilever membrane, which has a larger width than the cantilever beam in order to be able to attach the cantilever to a probe holder. Thereafter the cantilever and the overcoated in-plane tip are underetched and the cantilever membrane structure is peeled off using a needle. A probe holder is fixed to the cantilever via the cantilever membrane, and the probe configuration is removed from the wafer. Finally the resulting ODP with in-plane ODT is attached to a metal needle as shown in FIG. 25B and can be used for nanoprobing.

The foregoing description details certain embodiments of the invention. It will be appreciated, however, that no matter how detailed the foregoing appears in text, the invention may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

What is claimed is:

1. A method of fabricating a probe configuration, comprising:
   forming a probe tip, comprising:
      providing a substrate,
      forming a recessed mold into the substrate on a first side of the substrate, the recessed mold shaped to form a probe body having an apex region,
      forming a first diamond layer on the substrate on the first side, wherein forming the first diamond layer includes at least partially filling the recessed mold with the first diamond layer such that a probe body having an apex region is formed in the recessed mold,
      patterning to at least partly remove the first diamond layer surrounding the probe body,
      removing a substrate material surrounding at least the apex region of the probe body, and
      forming a second diamond layer covering at least the apex region of the probe body;
   attaching the probe tip to a first end of a cantilever; and
   attaching a second end of the cantilever to a holder.

2. The method of claim 1, wherein patterning to at least partly remove the first diamond layer includes forming a cavity extending through the first diamond layer and partly surrounding the probe body, thereby exposing the substrate underlying the cavity.

3. The method of claim 2, wherein removing the substrate material includes removing the substrate material from the exposed substrate through the cavity via a wet etch process, thereby further extending the cavity into the substrate to surround the apex region of the probe body.

4. The method of claim 3, wherein forming the second diamond layer includes depositing the second diamond layer from the first side of the substrate though the cavity onto the apex region of the probe body.

5. The method of claim 1, wherein patterning to at least partly remove the first diamond layer includes removing the first diamond layer surrounding the probe body to form an island of the first diamond layer.

6. The method of claim 5, wherein removing the substrate material includes removing the substrate material though a cavity formed from a second side of the substrate opposite the first side, wherein the cavity is formed using a wet etch process and extends through the substrate to expose the apex region of the probe body.

7. The method of claim 6, wherein forming the second diamond layer includes depositing the second diamond layer from the second side of the substrate though the cavity onto the apex region of the probe body.

8. The method of claim 1, wherein the first diamond layer and the second diamond layer have average grain sizes or electrical conductivities that are different by at least 1%.

* * * * *